March 5, 1963     K. A. MERZ     3,080,105
BLOWER WHEEL
Original Filed Nov. 21, 1955
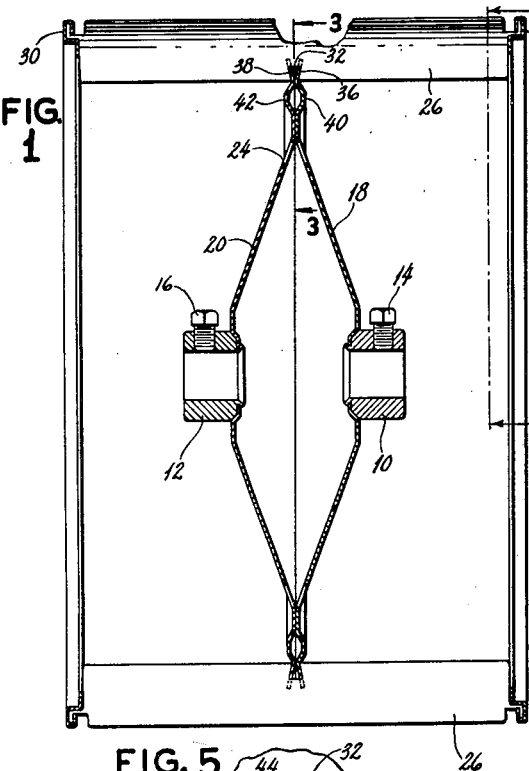
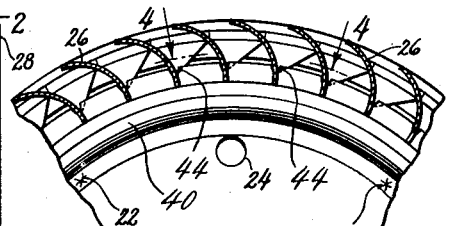
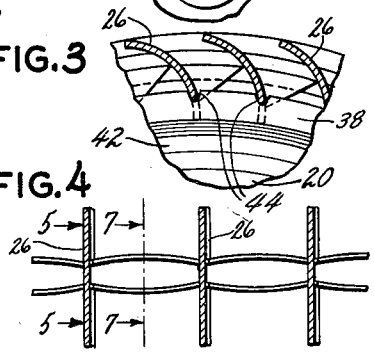
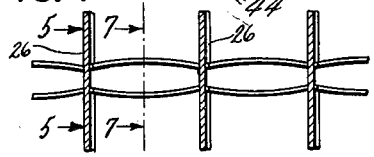
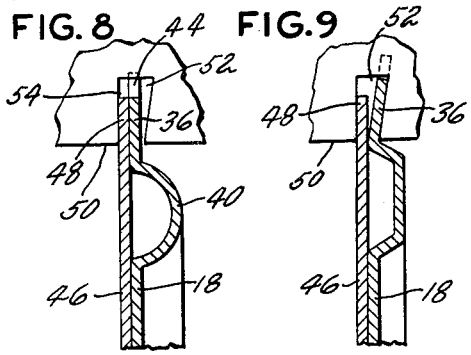
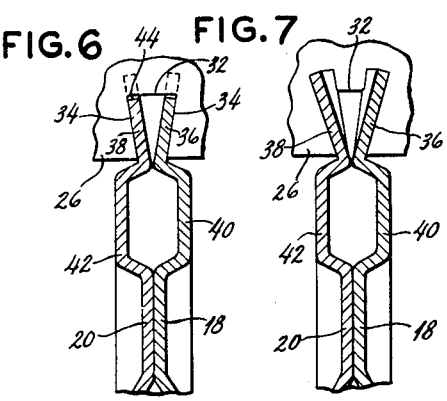
INVENTOR.
KENNETH A. MERZ
BY Teller & McCormick
ATTORNEYS

United States Patent Office 3,080,105
Patented Mar. 5, 1963

3,080,105
BLOWER WHEEL
Kenneth A. Merz, Cornwall, Conn., assignor to The Torrington Manufacturing Company, Torrington, Conn., a corporation of Connecticut
Original application Nov. 21, 1955, Ser. No. 548,166, now Patent No. 3,004,326, dated Oct. 17, 1961. Divided and this application Oct. 30, 1959, Ser. No. 849,888
5 Claims. (Cl. 230—134)

This application is a division of my application Serial No. 548,166 filed November 21, 1955, now Patent No. 3,004,326, and entitled Support Structure and Method for Making a Blower Wheel, the last said application being a continuation-in-part of my prior application Serial No. 441,612 filed July 6, 1954 for Blower Wheel and Method of Making, now abandoned.

The invention relates to a blower wheel of the type wherein there is an annular series of longitudinal air moving blades and wherein there is a generally radial structure engaging the blades between the ends thereof to connect them with a central hub or hub means.

One object of the invention is to provide a simple, dependable and inexpensive connection between the radial structure and the blades for holding the blades in fixed relationship with the said radial structure.

In the drawing I have shown in detail alternative blower wheels embodying the invention, but it will be understood that various changes may be made from the constructions shown, and that the drawing is not to be construed as defining or limiting the scope of the invention, the claims forming a part of this specification being relied upon for that purpose.

Of the drawing:

FIG. 1 is a vertical longitudinal sectional view of a blower wheel embodying the invention.

FIG. 2 is a fragmentary transverse sectional view taken along the line 2—2 of FIG. 1.

FIG. 3 is an enlarged fragmentary transverse sectional view taken along the line 3—3 of FIG. 1.

FIG. 4 is an enlarged fragmentary sectional view taken along the line 4—4 of FIG. 2.

FIG. 5 is an enlarged fragmentary sectional view taken along the line 5—5 of FIG. 4 but showing the parts in an intermediate stage in the method of making the blower wheel.

FIG. 6 is a view similar to FIG. 5 but showing the parts in final positions.

FIG. 7 is an enlarged fragmentary sectional view taken along the line 7—7 of FIG. 4.

FIG. 8 is a view similar to FIG. 5 but showing alternative structural features.

FIG. 9 is a view similar to FIG. 6 but showing the same alternative features as shown in FIG. 8.

Referring to the drawing and more particularly to FIGS. 1 to 7 thereof, the blower wheel as illustrated includes a hub means which is shown as comprising two separate similar hubs 10 and 12. When the hub means comprises two hubs such as 10 and 12, the two hubs are in longitudinal register with each other and are rotatable about the same longitudinal axis. They are adapted for mounting on a rotatable shaft and as shown set screws 14 and 16 are provided for connecting the hubs with the shaft. At least one generally radial supporting member or disc 18 is provided, this disc having its inner portion rigidly connected with the hubs means. A second supporting member or disc 20 is also provided and this is preferably similar to the disc 18. When there are two similar discs they are rigidly connected respectively with the two hubs 10 and 12. The discs 18 and 20 are connected with each other near their peripheries as for instance by spot welding, as indicated at 22, 22. The discs 18 and 20 are preferably partly conical in shape so that the hubs 10 and 12 are spaced apart longitudinally and so that the portions of the discs adjacent the hubs converge toward their connected peripheral portions. One or more drain holes such as 24 may be provided in at least one of the discs to permit the escape of water which might otherwise accumulate in the space between the discs. The discs 18 and 20 are shown as being identical in construction but in relatively reversed positions.

The blower wheel includes an annular series of equally spaced longitudinal air moving blades 26, 26, the said series being concentric with the axis and the blades of the said series being adjacent the periphery of the disc or discs. The blades 26, 26 may have any usual or preferred cross-sectional shape and the shape of the blades does not constitute any part of the present invention. The blades are shown as being structurally separate from each other, but the invention is not necessarily so limited.

Means are provided at the ends of the blades for connecting them with each other, these means being shown as being two similar end rings 28 and 30. The details of connection between the blades and the end rings may be in accordance with conventional practice and do not constitute any part of the present invention. The blades 26, 26 are formed respectively with notches 32 near their centers, the several notches being arranged in an annular series, each notch extends outwardly from the inner edge of the corresponding blade and has opposite outwardly extending lateral edges 34, 34 which preferably diverge outwardly. As shown, the edges 34, 34 of each notch 32 are straight and are equally inclined in opposite directions from a central radial plane, but as to these details there may be substantial variation.

The disc 18 has an annular peripheral portion 36 which is located in the notches 32 of the several blades. The supporting member additional to the disc 18 has an annular peripheral portion 38 that is also located in the said notches 32. When the additional means or member is a second disc such as 20, the said portion 38 is a peripheral portion similar to the peripheral portion 36 of the disc 18. In the blower wheel as shown in FIG. 1, the supporting members or discs are in direct engagement with each other along an annular zone which is immediately adjacent the inner edges of the blades and the annular peripheral portions 36 and 38 of the supporting members or discs that are radially outside of said annular zone and are located in said notches are spaced apart and they diverge outwardly. Said peripheral portions are respectively in engagement under pressure with the opposite outwardly extending edges of said notches 32 in the blades 26.

During manufacture, pressure is applied to said two supporting discs 18 and 20 to cause said peripheral portions 36 and 38 thereof to swing away from each other and outwardly diverge so that said annular peripheral portions 36 and 38 have the aforesaid pressure engagement respectively with the opposite edges of the blade notches 32 so as to firmly hold the blades 26 in fixed relationship to said discs 18 and 20. As shown in FIG. 5 at least one of the supporting members or discs 18 and 20 is initially formed with an annular bead such as 40, this bead being adjacent and spaced inwardly from the corresponding peripheral portion 36. The bead 40 on one disc projects away from the other disc. Preferably and as shown, the two members or discs 18 and 20 have similar oppositely projecting annular beads 40 and 42 adjacent and spaced inwardly from the peripheral portions 36 and 38. The members or discs 18 and 20 have inner annular portions at least approximately in contact with each other and located adjacent the inner edges of the beads.

In making the blower wheel the discs 18 and 20 are connected with the hubs 10 and 12 and the discs are connected with each other, as previously described. The said discs with their annular beads and the said hub means collectively constitute an initial central support structure for the blower wheel.

The blades 26, 26 are assembled with the support structure, the blades being assembled so that the peripheral portions 36 and 38 are located in the notches 32 as shown in FIG. 5. The outer edges of the beads 40 and 42 are closely adjacent the inner edges of the blades 26, but are nevertheless spaced inwardly therefrom to a small extent. The assembled parts are preferably held temporarily in a suitable fixture so that the annular series of blades is concentric with the axis of the hubs. Thereafter the end rings 28 and 30 are put in place so as to connect the blades with each other and thus hold them in their proper spaced relationship.

After preliminary assembly as described, the bead 40 or both beads 40 and 42 are subjected to longitudinal pressure throughout their entire lengths. The beads are at least partly flattened, being changed from the shapes shown in FIG. 5 to the shapes shown in FIG. 6. The partial flattening of each bead resultantly causes the corresponding peripheral portion to swing away from the other peripheral portion and, when there are two beads such as 40 and 42 and two peripheral portions such as 36 and 38, said peripheral portions swing away from each other. At the same time the diameters of the discs are slightly increased so that the outer edges of the beads 40 and 42 move closer to the inner edges of the blades 26 as shown in FIG. 6. The described swinging movements of one or both of the peripheral portions 36 and 38 cause them to outwardly diverge and to engage the edges 34, 34 of the several blade notches as shown in FIG. 6, the blades and the discs being thus firmly connected with each other. When the notch edges outwardly diverge, as is preferred, the outwardly diverging peripheral portions 36 and 38 engage and fit said notch edges 34, 34 throughout major parts of the lengths thereof.

When the peripheral portions of the members or discs engage the edges of the blade notches 34, 34 as shown in FIG. 6, the applied longitudinal pressure is continued and the swinging movements of the peripheral portions tend to continue beyond the positions shown, but said swinging movements are limited by the engagement of said peripheral portions with the opposite edges of the blade notches 34, 34. As the result of said limitation of the swinging movements of the peripheral portions, said members or discs are so stressed that they inherently cause said engagement of the peripheral portions with the opposite edges of the several notches to be under pressure. Between the blades the swinging movements are not limited by direct engagement with the blades and the peripheral portions between the blades swing away from each other to greater extents as shown in FIG. 7. The outer edges of the peripheral portions therefor undulate as shown in FIG. 4. It will be seen that the said peripheral portions 36 and 38 have a divergence between the blades which is greater than the divergence at the blades. Thus the peripheral portions of the members or discs tend to hold the blades in proper spaced relationship.

Preferably at least one of the members or discs 18 and 20 is provided with peripheral notches 44, 44 spaced in accordance with the spacing of the blades 26, 26. The notches 44, 44 are shaped to accommodate the curvature of the blades, as shown in FIG. 3. As shown both discs 18 and 20 are provided with notches 44, 44, the notches in the two discs being in register with each other. During initial assembly, the blade portions adjacent the outer edges of the blade notches 32 are entered in the disc notches as shown in FIGS. 3 and 5. When the discs are deformed from the FIG. 5 shape to the FIG. 6 shape, the said portions of the blades remain at least partly entered in the disc notches as shown in FIG. 6. Thus the notches in the discs cooperate with the undulating peripheral shapes of the discs to positively hold the blade in proper spaced relationship.

FIGS. 8 and 9 are similar respectively to FIGS. 5 and 6 but they illustrate the fact that one of the two discs or supporting members may be flat and without any bead such as 40 or 42.

As shown in FIG. 8, a disc 18 is provided which is or may be exactly the same as the disc 18 shown in FIG. 5. In lieu of the beaded disc 20 there is provided a flat disc 46 which need not be directly connected with the hub means, but which is shown as having a large central opening and as being connected by welding or otherwise to the disc 18, the connection being near the edge of said opening. The disc 46 is entirely flat and the diameter of its peripheral portion 48 is the same as the diameter of the disc 18 at the bottoms of the notches 44.

Alternative blades 50 are provided having notches 52 which are similar to the notches 32 except that the edge 54 at the left is perpendicular instead of inclined.

After preliminary assembly as previously described, the bead 40 of the disc 18 is subject to longitudinal pressure and the bead is at least partly flattened as shown in FIG. 9. The partial flattening of said head resultantly causes the peripheral portion 36 of the disc 18 to swing away from the peripheral portion 48 of the disc 46. At the same time the diameter of the disc 18 is slightly increased. The described swinging movement of the portion 36 of the disc 18 away from the peripheral portion 48 of the disc 46 causes said peripheral portions to outwardly diverge and to engage the outwardly diverging edges of the blade notches 52 as shown in FIG. 9, the blades and the discs being thus firmly connected with each other. The peripheral portions of the discs are in engagement under pressure with the edges of the blade notches 52, 52.

The invention claimed is:

1. In a centrifugal blower wheel, the combination of a hub means rotatable about a central longitudinal axis and adapted for mounting on a rotatable shaft, an annular series of equally spaced axially extending air moving blades which annular series is concentric with the axis of the hub means, the blades of said series having opposite radially spaced inner and outer edges and also having axially spaced opposite ends, and said blades being formed with notches arranged in an annular series and each said notch extending outwardly from the inner edge of its blade and each said notch having opposite outwardly extending and outwardly diverging lateral edges, means at said opposite ends of the blades for connecting them with each other, and two separate generally radial sheet metal supporting members rigidly connected with the hub means and extending radially outwardly therefrom, said supporting members having peripheral portions located in said notches in the blades and said members being in direct engagement with each other along an annular zone immediately adjacent and inwardly of the inner edges of the blades and the entire annular peripheral portions of said members that are radially outside of said annular zone being spaced apart and diverging outwardly and respectively in engagement with the opposite outwardly diverging edges of the several notches in the blades throughout the major parts of the lengths of said edges and said supporting members being so stressed that they inherently cause said engagement with the notch edges to be under pressure.

2. In a centrifugal blower wheel, the combination of a hub means rotatable about a central longitudinal axis and adapted for mounting on a rotatable shaft, an annular series of equally spaced axially extending air moving blades which annular series is concentric with the axis of the hub means, the blades of said series having opposite radially spaced inner and outer edges and also having axially spaced opposite ends, and said blades being formed with notches arranged in an annular series and each said notch extending outwardly from the inner edge of its blade and each said notch having opposite outwardly extending lateral edges which diverge outwardly and to equal extents from a central plane perpendicular to the axis, means at said opposite ends of the blades for connecting them with each other, and two separate similar generally radial sheet metal supporting discs each rigidly connected with the hub means and extending radially outwardly therefrom, said supporting discs having peripheral portions located in said notches in the blades and said discs being in direct engagement with each other along an annular zone immediately adjacent and inwardly of the inner edges of the blades and the entire annular peripheral portions of said discs that are radially outside of said annular zone being spaced apart and diverging outwardly and to equal extents from a central plane perpendicular to the axis, and respectively in engagement with the opposite outwardly diverging edges of the several notches in the blades through the major parts of the lengths of said edges and said discs being so stressed that they inherently cause said engagement with the notch edges to be under pressure.

3. In a centrifugal blower wheel, the combination of a hub means rotatable about a central longitudinal axis and adapted for mounting on a rotatable shaft, an annular series of eqully spaced axially extending air moving blades which annular series is concentric with the axis of the hub means, the blades of said series having opposite radially spaced inner and outer edges and also having axially spaced opposite ends, and said blades being formed with notches arranged in an annular series and each said notch extending outwardly from the inner edge of its blade and each said notch having opposite outwardly extending and outwardly diverging lateral edges, means at said opposite ends of the blades for connecting them with each other, and two similar generally radial sheet metal supporting discs rigidly connected with each other and having inner portions rigidly connected with the hub means and having annular peripheral portions located in said notches in the blades, said annular peripheral portions of the discs being spaced apart and diverging outwardly and respectively in engagement under pressure with the opposite outwardly diverging edges of the notches in the blades throughout the major parts of the lengths of said edges so as to connect the blades with the discs and said annular peripheral portions of said discs having a divergence between the blades greater than the divergence at the blades so that the greater divergence between the blades tends to maintain the blades in equally spaced relationship.

4. In a centrifugal blower wheel, the combination of a hub means rotatable about a central longitudinal axis and adapted for mounting on a rotatable shaft, an annular series of eqully spaced axially extending air moving blades which annular series is concentric with the axis of the hub means, the blades of said series having opposite radially spaced inner and outer edges and also having axially spaced opposite ends, and said blades being formed with notches arranged in an annular series and each said notch extending outwardly from the inner edge of its blade and each said notch having outwardly extending and outwardly diverging lateral edges, means at said opposite ends of the blades for connecting them with each other, and two similar generally radial supporting discs having their inner portions rigidly connected with the hub means, the said two discs having annular peripheral portions located in the said notches in the blades and said annular peripheral portions of the discs being spaced apart and outwardly diverging and respectively in engagement under pressure with the outwardly diverging edges of said notches and at least one of said discs having notches in its periphery equally spaced to receive and approximately fit the blade portions adjacent the outer edges of the blade notches so that said disc notches tend to maintain the blades in equally spaced relationship.

5. In a centrifugal blower wheel, the combination of a hub means rotatable about a central longitudinal axis and adapted for mounting on a rotatable shaft, an annular series of eqully spaced axially extending air moving blades which annular series is concentric with the axis of the hub means, the blades of said series having opposite radially spaced inner and outer edges and also having axially spaced opposite ends, and said blades being formed with notches arranged in an annular series and each said notch extending outwardly from the inner edge of its blade and each said notch having outwardly diverging lateral edges, means at said opposite ends of the blades for connecting them with each other, and two similar generally radial sheet metal supporting discs rigidly connected with each other and having inner portions rigidly connected with the hub means and having annular peripheral portions located in the said notches in the blades, said annular peripheral portions of the discs being spaced apart and diverging outwardly and respectively in engagement under pressure with the outwardly diverging edges of the notches in the blades so as to connect the blades with the discs and said annular peripheral portions having a divergence between the blades greater than the divergence at the blades so that the greater divergence between the blades tends to maintain the blades in equally spaced relationship and at least one of the said discs having notches in its periphery equally spaced to receive and approximately fit the blade portions adjacent the outer edges of the blade notches so that said disc notches cooperate with the greater divergence of the peripheral portions of the discs between the blades to maintain the blades in equally spaced relationship.

References Cited in the file of this patent

UNITED STATES PATENTS

| | | |
|---|---|---|
| 478,191 | Hide | July 5, 1892 |
| 886,515 | Jude | May 5, 1908 |
| 903,532 | Anderson | Nov. 10, 1908 |
| 931,403 | Fleming | Aug. 17, 1909 |
| 978,036 | Klahn | Dec. 6, 1910 |
| 1,377,634 | Slick | May 10, 1921 |
| 1,748,452 | Martins | Feb. 25, 1930 |
| 2,125,697 | Swingle et al. | Aug. 2, 1938 |
| 2,240,238 | Baker | Apr. 29, 1941 |
| 2,304,581 | Lyon | Dec. 8, 1942 |
| 2,315,407 | Evans | Mar. 30, 1943 |
| 2,537,805 | Wilken | Jan. 9, 1951 |
| 2,825,124 | Nichols et al. | Mar. 4, 1958 |
| 3,021,591 | Mayne et al. | Feb. 20, 1962 |

FOREIGN PATENTS

| | | |
|---|---|---|
| 294,629 | Great Britain | Feb. 14, 1924 |